(12) United States Patent
Van De Rostyne et al.

(10) Patent No.: US 8,361,595 B2
(45) Date of Patent: Jan. 29, 2013

(54) WIPER BLADE RUBBER AND METHOD FOR THE PRODUCTION THEREOF

(75) Inventors: Kris Van De Rostyne, Opvelp (BE); Reiner Lay, Aachen (DE); Vincent Duval, Bruxelles-Schaerbeek (BE); Marc Pironnet, Hakendover (BE); Bart Clerx, Bitzen (BE); Wim Buseyne, Hasselt (BE)

(73) Assignee: Robert Bosch GmbH, Stuttgart (DE)

( * ) Notice: Subject to any disclaimer, the term of this patent is extended or adjusted under 35 U.S.C. 154(b) by 576 days.

(21) Appl. No.: 12/527,227

(22) PCT Filed: Jan. 25, 2008

(86) PCT No.: PCT/EP2008/050887
§ 371 (c)(1),
(2), (4) Date: Aug. 14, 2009

(87) PCT Pub. No.: WO2008/113624
PCT Pub. Date: Sep. 25, 2008

(65) Prior Publication Data
US 2010/0095472 A1  Apr. 22, 2010

(30) Foreign Application Priority Data
Mar. 19, 2007 (DE) .......................... 10 2007 012 924

(51) Int. Cl.
*B32B 25/02* (2006.01)
(52) U.S. Cl. ..................... 428/141; 428/172; 428/195.1; 15/250.001
(58) Field of Classification Search ............... 428/195.1, 428/141, 172; 15/250.001
See application file for complete search history.

(56) References Cited

U.S. PATENT DOCUMENTS

| 6,077,592 | A | 6/2000 | Azuma et al. |
| 6,742,807 | B2 | 6/2004 | Muller et al. |
| 6,858,284 | B2 | 2/2005 | Nun et al. |
| 7,441,302 | B2 | 10/2008 | Hiruma et al. |
| 2003/0138655 | A1* | 7/2003 | Watanabe et al. ............. 428/523 |
| 2004/0237229 | A1 | 12/2004 | Hiruma et al. |

FOREIGN PATENT DOCUMENTS

| DE | 19741225 | 3/1998 |
| DE | 19814804 | 10/1999 |
| DE | 10025629 A1 | 11/2001 |
| DE | 10116926 | 10/2002 |
| DE | 102005000851 A1 | 8/2005 |
| EP | 1059213 | 12/2000 |

(Continued)

OTHER PUBLICATIONS

Translation of DE 19814804.*

(Continued)

*Primary Examiner* — Gerard Higgins
*Assistant Examiner* — Christopher Polley
(74) *Attorney, Agent, or Firm* — Michael Best & Friedrich LLP

(57) ABSTRACT

The invention relates to a wiper blade rubber and a method for the production thereof, in particular for a rail wiper of a motor vehicle, made from a formed, vulcanizable elastomer material the surface of which comprises a surface layer which is hydrophobic, with a contact angle with respect to water greater than 90°, preferably greater than 120°, and a surface structure with raised regions and/or recesses in the micrometer range.

14 Claims, 2 Drawing Sheets

FOREIGN PATENT DOCUMENTS

| | | |
|---|---|---|
| EP | 1243489 A2 | 9/2002 |
| EP | 1561656 A2 | 8/2005 |
| FR | 2811325 | 1/2002 |
| FR | 2882558 A1 | 9/2006 |
| FR | 2886251 A1 | 12/2006 |
| WO | 99/51473 A1 | 10/1999 |

OTHER PUBLICATIONS

PCT/EP2008/050887 International Search Report.

\* cited by examiner

WIPER BLADE RUBBER AND METHOD FOR
THE PRODUCTION THEREOF

BACKGROUND OF THE INVENTION

The invention relates to a wiper blade rubber for a windshield wiper, in particular to a windshield wiper of a motor vehicle. It further relates to a process for production of the same.

The wiper blade rubbers or wiper strips within a wiper blade of a windshield wiper serve by way of example for the removal of water droplets on a windshield of a motor vehicle and are moved back and forth by the windshield wipers of a windshield-wiper system. Wiper blade rubbers are usually molded from a hydrophobic extruded or injection-molded starting material, for example from an unvulcanized, synthetic rubber, and then vulcanized. The general requirements placed upon a wiper blade rubber encompass not only high wipe quality but also resistance to abrasion, low frictional resistance, and good slip properties on hydrophilic and hydrophobic surfaces, in order to achieve appropriate running performance of the wiper blade rubber on the various surfaces.

Good wipe qualities are generally achieved using relatively soft wiper blade rubber qualities, but these often exhibit disadvantageous running performance in particular on hydrophobic surfaces, because of a high coefficient of friction. In the prior art, it is known that the surface of the wiper blade rubber can be subjected to post-treatment in order to improve the running performance of the wiper blade rubber. By way of example, the surface is halogen-treated, i.e. chlorination or bromination is carried out. This hardens the surface of the wiper blade rubber, thus reducing the coefficient of friction of the relatively soft rubber material of the wiper blade rubber. Even when frictional resistance is reduced by reducing the coefficient of friction, this is not generally sufficient to obtain a marked improvement in the running performance of the wiper blade rubber. Furthermore, in this way surfaces post-treated often exhibit a low contact angle with respect to water, i.e. are not very hydrophobic, the result being non-ideal wipe quality in particular on hydrophobic surfaces.

It is also known that the running performance of the wiper blade rubber can be improved via surface coating. It is therefore known that it is possible to apply, to the surface of a wiper blade rubber, a layer which usually comprises a fine lubricating powder, examples being pulverulent molybdenum disulfide or graphite. A large number of other materials are known in the prior art for such coatings. DE 10 2005 000 851 A1 describes, for example, a wiper blade with a wiper blade rubber obtained via vulcanization, where a foil or a layer derived from granulated material has been applied to the wiper rubber lip of the wiper blade rubber in order to reduce the coefficient of friction. The coating material can be applied in the form of a jet or spray, or in any other form, to the elastomeric surface.

A further embodiment of the coating of the surface of a wiper blade rubber provides the application of an antifriction coating, with the aim of maximizing the reduction in coefficient of dry friction. DE 101 16 926 A describes antifriction-coating components, antifriction coating, and an appropriate process for the coating of elastomers, where the antifriction-coating components encompass not only a polyurethane and a siloxane but also a polyamide powder, a polyethylene powder, or a solution of a polyamide. The antifriction coating can comprise an isocyanate-based hardener.

The surfaces produced in the case of coating with an antifriction coating, with a foil, or with a layer derived from granulated material are generally coherent, and this means that the coating applied forms a new surface, which completely covers the elastomeric surface situated thereunder. The surface produced by powder coating is generally not coherent, and the elastomeric surface located thereunder is therefore to some extent visible.

Little is generally known about the surfaces of wiper blade rubbers in relation to their performance with respect to water, i.e. their hydrophobicity. The hydrophobicity of materials is a measure of the level of their hydrophobic properties and can be stated in the form of a contact angle which appears between a droplet of liquid, such as water, and the surface of the material, using air as third phase. A surface with a contact angle greater than 90° is termed hydrophobic, at contact angles greater than 120° the surface can be termed highly hydrophobic, and at contact angles greater than 150° it can be termed superhydrophobic. Particularly advantageous wipe qualities of wiper blade rubbers are achieved when the surface is highly hydrophobic, i.e. exhibits a contact angle greater than 120°.

EP 1 249 280 discloses self-cleaning surfaces and a process for their production, where hydrophobic particles with a size in the micrometer range to submicrometer range are applied to a surface and in turn have a fissured structure in the nanometer range. These surfaces exhibit a high level of hydrophobicity, with contact angles greater than 150°.

SUMMARY OF THE INVENTION

The wiper blade rubber of the invention, for a windshield wiper, in particular for a windshield wiper of a motor vehicle, composed of a molded, vulcanizable elastomeric material, is characterized in that the surface of the wiper blade rubber has a surface layer which is hydrophobic with a contact angle greater than 90° with respect to water, preferably greater than 120°, and with a surface structure with elevations and/or depressions in the micrometer range.

An advantage of the present invention is an increase in the wipe quality of a wiper blade rubber, thus improving wipe performance on a hydrophilic surface, for example on a windshield wetted by a water film, and also improving the running performance of the wiper blade rubber on a hydrophobic surface.

It is advantageous that the hydrophobicity of the wiper blade rubber is markedly higher than that achieved via coatings or surface treatments known from the prior art. A further advantage is that the increased hydrophobicity substantially raises the wipe quality of the wiper blade rubber. A further advantage of the present invention is found in a structuring of the surface of the wiper blade rubber, since this achieves a self-cleaning effect of the wiper blade rubber surface, caused by high hydrophobicity and a structure of the surface of the wiper blade rubber.

The process of the invention for the production of a wiper blade rubber has the advantage over the prior art that, in the invention, a surface treatment of the wiper blade rubber does not produce any free chlorine or bromide, since there is no need for any treatment step including halogenation of the wiper blade rubber. A further advantage is that the costs of surface treatment can be reduced, since the surface of the wiper blade rubber to be produced does not have to be halogenated. Furthermore, there is advantageous linking between the individual steps of the process, thus allowing costs to be reduced.

In the invention, the surface of wiper blade rubbers is preferably hydrophobized and structured via the use of powders or foils for the coating of the surface of the wiper blade rubber.

The hydrophobicity of a surface, i.e. the measure of the level of hydrophobic properties, can be stated in the form of the contact angle, which is the angle formed by a liquid droplet on the surface of a solid, with respect to said surface. For contact angles greater than 90°, the surface is termed hydrophobic, at contact angles greater than 120° it is termed highly hydrophobic, and at contact angles greater than 150° it is termed superhydrophobic. At contact angles greater than 160°, the liquid droplets applied assume an almost spherical shape, and can therefore run off the surface in droplet form. Dirt particles in loose contact with the surface can thus be rinsed away by the liquid droplets as they roll off. This extreme example of a hydrophobic surface with a contact angle above 160° has been observed on the leaves and flowers of the lotus plant. The phenomenon is termed the lotus effect, and refers to the extremely low wettability and the high level of self-cleaning effect of the surfaces of the lotus plant. The cause of said effect lies in a particular micro and nanostructured, superhydrophobic surface with elevations with a height of from 5 to 20 µm and a separation of from 5 to 50 µm from one another. This natural principle has been used inter alia by industry in order to produce self-cleaning surfaces for a wide variety of applications.

In the wiper blade rubber of the invention, by analogy with the lotus effect, a process of the invention produces a hydrophobic surface on the wiper blade rubber with a contact angle of greater than 90° with respect to water, preferably greater than 120°. The surface thus produced is not smooth/coherent, but instead is structured/non-coherent.

For production of the wiper blade rubber of the invention, the surface of an elastomeric material is coated. By way of example, a powder is used for this purpose. In the context of this application, a powder is the term used for a mixture of a solid where the mixture is advantageously composed of individual particles with a particle size distribution smaller than 100 µm, preferably smaller than 50 µm. For another type of the coating of the invention, a foil can be used. In this context, the term foil means a coherent area of a suitable material, with the maximum possible constancy of thickness across the area. For the purposes of the application, a structured surface is the term used for a surface which has a certain roughness, i.e. has elevations/depressions, thus achieving unevenness of the surface, preferably in the micrometer range. The elevations/depressions here have a certain separation from one another in the pm range, this being smaller than 200 µm, preferably smaller than 100 µm, and particularly preferably smaller than 50 µm. The structure of the surface can by way of example be formed by way of cavities, peaks, and/or sharp irregularities.

In the invention, coating of the surface of a wiper blade rubber is used to achieve a hydrophobic surface with a contact angle greater than 90°, preference being given to producing a highly hydrophobic surface with a contact angle greater than 120°. In the invention, the surface has a structure which encompasses elevations/depressions which on average have a height of from 1 to 100 µm, preferably on average a height of from 1 to 50 µm, their separation from one another being from 1 to 200 µm, preferably from 1 to 100 µm, with preference from 1 to 50 µm.

Examples of materials suitable for coating as in the invention on the surface of a wiper blade rubber are thermoplastic materials, such as polyethylene, polyamide, polypropylene, polytetrafluoroethylene, and also minerals, silicates including those in modified form, carbon black, metal oxides, and metal powders, and mixtures thereof. The desired product properties of the wiper blade rubber, i.e. advantageous running performance and good wipe qualities, can therefore be achieved by virtue of the wide variety of materials that can be used. The coating of the surface of the wiper blade rubber as in the invention can be achieved via application of a powder or via application of a pretreated foil or of a foil to be structured in a post-treatment step. The coating of the surface of the wiper blade rubber here means the production of a surface layer which is applied to the surface of a wiper blade rubber and is bonded thereto. The thickness of the surface layer of the invention is in the range from 1 to 100 µm, preferably in the range from 1 to 50 µm.

A wiper blade rubber encompasses a rod-shaped base section and an antifriction section with a lip in the form of a thin strip. For economic reasons, previous processes for the production of wiper blade rubbers provide the simultaneous production of double profiles, where the corresponding profile is continuously extruded from vulcanizable polymer mixtures, and vulcanized, and then the profiles are separated from one another. The starting material used for a wiper blade rubber for windshield wipers, in particular for windshield wipers of motor vehicles, is a rubber material, because it has high flexibility and thus can remove water cleanly from the glass surface of a windshield during the wiping procedure. Suitable starting materials for a wiper blade rubber are ethylene-propylene-diene monomer (EPDM), ethylene-propylene monomer (EPM), chloroprene rubber (CR), natural rubber (NR), and mixtures of the same.

BRIEF DESCRIPTION OF THE DRAWING

The drawings show embodiments of the invention, which are explained in more detail in the description that follows.

DETAILED DESCRIPTION

Figure 1:
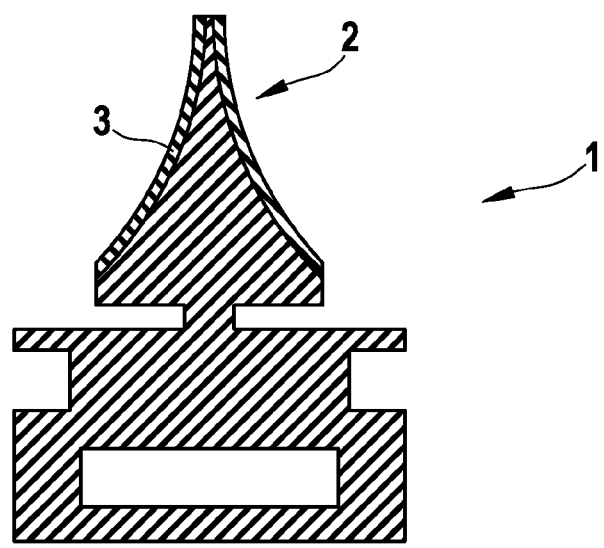
FIG. 1 shows an individual profile 1 of a wiper blade rubber 2.

FIG. 1 shows an individual profile 1 of a wiper blade rubber 2 with a surface layer 3 applied in one embodiment of the invention after the vulcanizing process and any cleaning step, on both sides of the wiper blade rubber 2.

Figure 2:
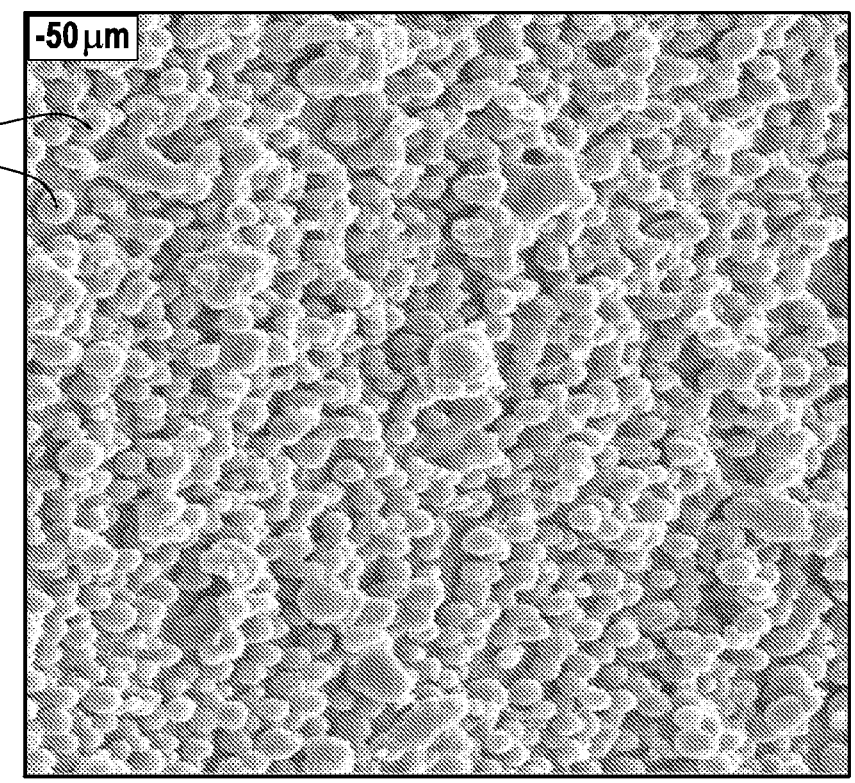
FIG. 2 shows a scanning electron micrograph of the surface of a wiper blade rubber of the invention.

The hydrophobic and structured surface layer 3 of the wiper blade rubber 2 of the invention is illustrated by the scanning electron micrograph (SEM) in FIG. 2. The particles are indicated by 4, these being applied to the surface of the wiper blade rubber 2 and bonded thereto.

The process which can be used advantageously to achieve the surface layer 3 with hydrophobic property and surface structure encompasses the application of particles 4 or of a foil produced from a suitable material in a separate process, not described in any further detail. The particles 4 applied or the foil applied is bonded to the surface of the wiper blade rubber 2, thus producing a surface layer 3 with the desired hydrophobic property and the structuring in the micrometer range. In one embodiment it is moreover possible that the resultant surface layer 3 is further hydrophobized and/or structured in subsequent steps, thus forming the preferred highly hydrophobic surface and the preferred structure with the elevations and/or depressions in the micrometer range.

It is preferable that the particles for the production of the desired surface layer 3 of the wiper blade rubber 2 are hydrophobic, these leading to formation of the hydrophobic surface layer 3 of the wiper blade rubber 2. The particles 4 here can themselves be appropriately hydrophobic, or they can be hydrophobized prior to application or else after the application process. The hydrophobization can take place in a manner known from the prior art.

In one embodiment of the process of the invention for the production of the wiper blade rubber 2, a particle mixture is applied to the surface of the wiper blade rubber 2 with the aid of a powder coating process. The powder applied to the surface can comprise ultrahigh-molecular-weight polyethylene with an average particle size of 10 µm. Here, particles 4 dispersed in air are applied to the surface of the wiper blade rubber 2, by way of example at both sides of a double profile, via specific spray equipment using compressed air, and the double profile is then separated, so that the wiper blade rubber tip not in contact with the windshield has no coating. The powder 4 can be applied in the form of a jet onto a vulcanized, or preferably onto a non-vulcanized, surface of the wiper blade rubber 2. By virtue of the good adhesive properties of the rubber, electrostatic charging of the particles 4 of the powder to be applied is not essential. In the case of electrostatic charging, the particles 4 of the mixture applied in the form of a jet preferably have the same charge and thus repel one another, permitting uniform application of the particles 4 on the surface of the wiper blade rubber 2. The particles 4 of the mixture applied in the form of a jet, or else the surface of the wiper blade rubber 2, can preferably be electrostatically charged via electrostatic contact, thus achieving improved adhesion of the particles 4 on the surface. It is preferable that the powder coating process is followed by a heat treatment, in order to achieve long lasting adhesion and uniform thickness of coating of the wiper blade rubber.

Another possible method for coating of the surface of the wiper blade rubber 2 with the particles is the wet coating process. In this process, the particles 4 are suspended in a suitable suspension medium, and the resultant stable suspension is applied to the surface of the wiper blade rubber 2. The suspension can be applied via suitable coating processes. Examples of these are dip coating or application in the form of a spray.

However, the particles 4 can also be applied by means of fluidized-bed sintering. In this process, the wiper blade rubber 2 is briefly immersed in a particle mixture fluidized with the aid of compressed air, and the particles 4 adhere to the immersed surface. In a subsequent step, the particles 4 can then be fused onto the surface by heating. As an alternative, the wiper blade rubber 2 can be heated prior to immersion into a fluidized particle mixture. By virtue of the temperature on the surface of the wiper blade rubber 2, the particles 4 fuse and cover the surface with a continuous coating. In order to achieve a uniform coating with constant thickness, care has to be taken that the particles 4 do not agglomerate as a consequence of any foreign substances present, to give larger associations.

Another alternative for applying the particles 4 to the surface of the wiper blade rubber 2 is provided by centrifugal application processes for application of the particles, e.g. using a metering wheel, or using rotating brushes.

The manner in which the particles 4 are applied to the surface of a wiper blade rubber 2 is preferably such as to form a surface layer 3 with constant density and thickness. The applied particles advantageously achieve a hydrophobic and structured surface. It is preferable that the amount of adherent particles 4 on the surface of the wiper blade rubber 2 is related to the adhesion of the wiper blade rubber material under the conditions prevailing, such as temperature and pressure. An excess of particles 4 can in turn be removed from the surface via controlled blow-off with compressed air or via suction-removal equipment.

In addition to, or as an alternative to, the adhesion of the wiper blade rubber material, the adhesion of the particles 4 on the surface can be promoted via pretreatment of the surface of the wiper blade rubber 2, for example with a primer. The term primer is used for a layer of material applied to the surface of a wiper blade rubber 2, where the particles initially adhere to this layer. To the extent that the primer does not function as adhesive, it can by way of example in turn be removed via evaporation in a subsequent step. The primer used preferably comprises a solvent in which the particles have been dispersed, whereupon after spray-application of the dispersion, the solvent evaporates and provides a homogeneous coating of constant thickness and density.

In one embodiment, the particles 4 applied are bonded in a further step to the surface of the wiper blade rubber 2. After the application of the particles, the particles of the powder are preferably bonded in a subsequent process step to the surface of the wiper blade rubber 2, in particular via a vulcanization process giving adhesion of the applied particles via heating, preferably in an oven, by means of IR heating or the like.

It is also possible to bond the applied particles to the surface of the wiper blade rubber 2 by means of a carrier. It is preferable that an adhesive is applied to the surface coated with the particles, thus achieving long lasting bonding between particles 4 and wiper blade rubber. The particles 4 can optionally be dispersed in an adhesive, and the suspension thus obtained can be applied in a suitable manner to the surface. The result of this is a stable surface coating on the wiper blade rubber 2. It is also possible to cause the particles 4 to impact the surface of the wiper blade rubber 2 at a certain velocity, so that these penetrate to a certain depth into the elastomeric material of an unvulcanized rubber. As an alternative, the surface to be coated on the wiper blade rubber 2 can be heated, in order to achieve stable continuous adhesion of the elastomeric material of the wiper blade rubber 2. A further possibility for bonding of the applied particles 4 to the surface of the wiper blade rubber 2 is the application of mechanical pressure to the particles 4, for example via pressure rollers, which are preferably heated and then pressed against the surface covered with particles, so that the particles 4 become bonded to the wiper blade rubber surface.

It is possible to apply the particles preferably prior to the vulcanization process to the extruded or cast rubber material, so that, during the subsequent vulcanization of the coated rubber material, the applied particles 4 are vulcanized onto the surface while the elastomeric material vulcanizes. It is advantageous that no, or very little, contamination is present on the wiper blade rubber surface immediately after the extrusion or injection-molding process, since this improves the adhesion conditions on the surface. A uniform coating can thus be achieved with simultaneous reduction in the process steps for production of a wiper blade rubber 2. It is also possible to apply the particles 4 to an only partially vulcanized wiper blade rubber surface. In this process, the vulcanization procedure of the wiper blade rubber 2 is interrupted, the particles 4 are applied in a suitable manner, and the vulcanization procedure of the now coated wiper blade rubber 2 is appropriately continued.

In one embodiment of the invention, a foil can be applied to the surface of the wiper blade rubber 2 in order to achieve a hydrophobic and structured surface layer. The foil composed of thermoplastic materials, for example polyethylene, polyamide, polypropylene or polytetrafluoroethylene, which, if appropriate, are also used in crosslinked form or in only partially crosslinked form, can be applied by means of a suitable adhesive, for example an epoxy amine adhesive. The foil preferably takes the form of self-adhesive foil which has a coating composed of an adhesive on a lower side and, on an upper side, in accordance with the invention, is hydrophobic and structured. In one advantageous embodiment, the foil can be applied to the surface of the wiper blade rubber material prior to the actual step of vulcanization of the wiper blade rubber material. The foil is vulcanized onto, or fused onto, the surface of the wiper blade rubber 2 during the subsequent vulcanization step, via the action of heat. As an alternative, the foil can be applied to a surface that has been previously partially vulcanized, i.e. the wiper blade rubber 2 can be removed from heating equipment after a certain vulcanization time after which it is only partially vulcanized.

In order to achieve the surface of the invention of the wiper blade rubber 2, i.e. in order to achieve the hydrophobic property and the structuring of the surface in the micrometer range, the foil to be applied can, for example, have a structure. The foil applied can preferably be further structured in a subsequent process step, so that the appropriate elevations or depressions in the micrometer range are produced, approximating to the lotus effect. Said subsequent process step encompasses by way of example ablation via a pulsed laser process or treatment of the wiper blade rubber where the wiper blade rubber material deforms elastically, while the coating material itself is deformed plastically.

As an alternative, the foil to be applied can have perforation, corresponding to the desired surface structuring. This can be way of example be achieved via a laser cutting process, producing depressions which on average have a height of smaller than 100 μm, preferably smaller than 50 μm. The separation of the depressions from one another is from 1 to 200 μm, preferably from 1 to 100 μm.

The present invention provides the possibility that the wiper blade rubber 2 can be used not only on hydrophilic windshields (clear glass) but also on windshields that have been treated with a water-repellent agent (hydrophobic windshield).

Figure 3:
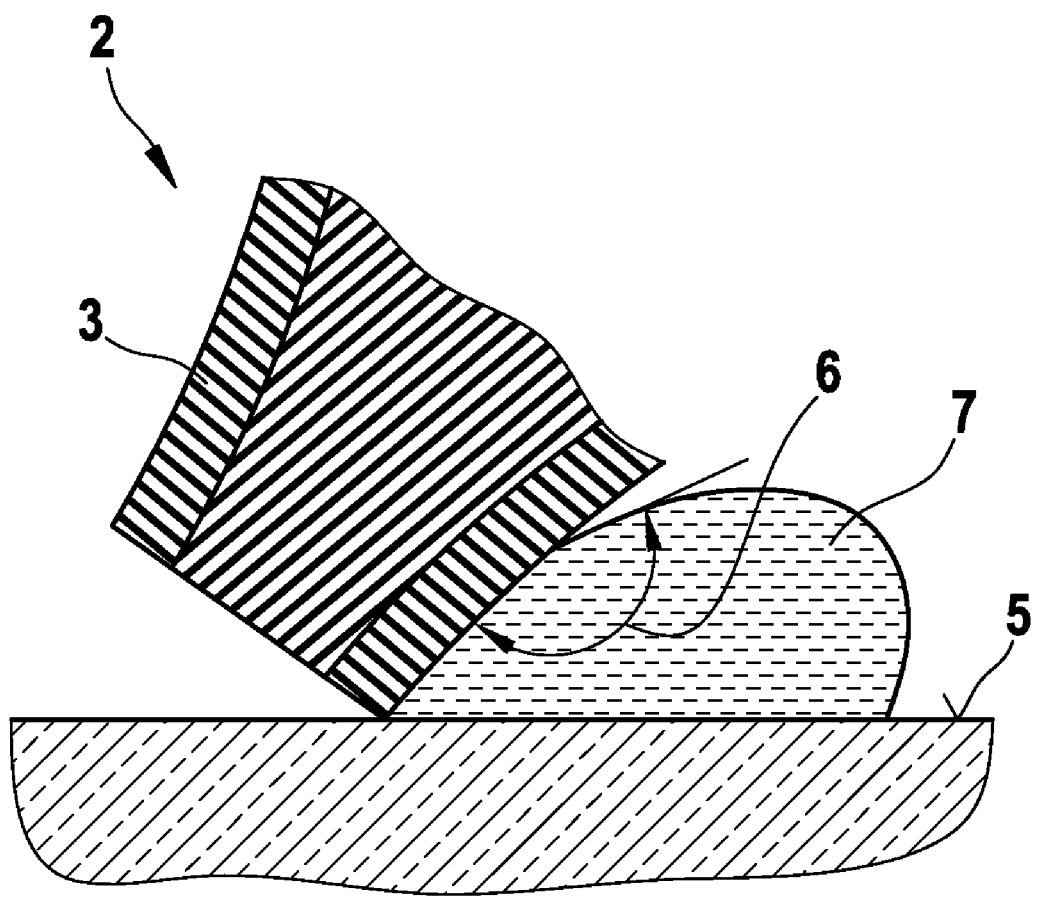
FIG. 3 shows a wiper blade rubber of the invention, with a hydrophobic surface layer, in use on a hydrophobic surface, for the removal of water.

FIG. 3 illustrates the effect of the hydrophobic and structured surface layer 3 on wiping performance during use of a wiper blade rubber 2 of the invention on a hydrophobic surface 5, for example a pane of glass in a motor vehicle. The contact angle 6 between the hydrophobic surface layer 3 and water 7 here is greater than 120°, effectively permitting removal of water from the pane of glass, since the wiper blade rubber 2 itself is not wetted.

What is claimed is:

1. A wiper blade rubber for a windshield wiper, comprising a molded, vulcanizable elastomeric material, and a surface layer which is hydrophobic with a contact angle greater than 90° with respect to water, and has a surface structure with elevations and/or depressions from 1 to 100 μm wherein the surface layer is a foil on the elastomeric material, wherein the foil has an upper side and a lower side, wherein the lower side has an adhesive layer, and the upper side has the surface structure and is hydrophobic.

2. The wiper blade rubber as claimed in claim 1, characterized in that the foil comprises a material selected from the group consisting of crosslinked or partially crosslinked polyethylene, polyamide, polypropylene, and polytetrafluoroethylene.

3. The wiper blade rubber as claimed in claim 1, characterized in that the foil is applied by means of a carrier to which the foil adheres.

4. The wiper blade rubber as claimed in claim 1, wherein the surface structure comprises depressions with average height of less than 100 μm and separation from 1 to 100 μm.

5. The wiper blade rubber as claimed in claim 1, wherein the surface layer (3) has a contact angle greater than 120° with respect to water.

6. A windshield wiper blade, comprising a molded, vulcanizable elastomeric material, and a surface layer which is hydrophobic with a contact angle greater than 90° with respect to water, and has a surface structure with elevations and/or depressions from 1 to 100 μm wherein the surface layer is a foil on the elastomeric material, wherein the foil has an upper side and a lower side, wherein the lower side has an adhesive layer, and the upper side has the surface structure and is hydrophobic.

7. The wiper blade as claimed in claim 6, characterized in that the foil comprises a material selected from the group consisting of crosslinked or partially crosslinked polyethylene, polyamide, polypropylene, and polytetrafluoroethylene.

8. The wiper blade as claimed in claim 6, characterized in that the foil is applied by means of a carrier to which the foil adheres.

9. The wiper blade as claimed in claim 6, wherein the surface structure comprises depressions with average a height of less than 100 μm, and separation from 1 to 100 μm.

10. The wiper blade as claimed in claim 6, wherein the surface layer (3) has a contact angle greater than 120° with respect to water.

11. The wiper blade rubber as claimed in claim 1, wherein the foil consists essentially of crosslinked or partially crosslinked polyethylene.

12. The wiper blade rubber as claimed in claim 1, wherein the foil consists essentially of crosslinked or partially crosslinked polyamide.

13. The wiper blade rubber as claimed in claim 1, wherein the foil consists essentially of crosslinked or partially crosslinked polypropylene.

14. The wiper blade rubber as claimed in claim 1, wherein the foil consists essentially of crosslinked or partially crosslinked polytetrafluoroethylene.

\* \* \* \* \*

UNITED STATES PATENT AND TRADEMARK OFFICE
CERTIFICATE OF CORRECTION

PATENT NO.       : 8,361,595 B2                                                                    Page 1 of 1
APPLICATION NO.  : 12/527227
DATED            : January 29, 2013
INVENTOR(S)      : Van De Rostyne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this
First Day of September, 2015

Michelle K. Lee
*Director of the United States Patent and Trademark Office*